3,280,218
GRAFT POLYMERS OF ETHYLENIMINE ONTO A POLYACRYLIC OR POLYMETHACRYLIC ACID BACKBONE
Donald J. Endsley, Clute, and Billy W. Wilson, Lake Jackson, Tex., assignors to The Dow Chemical Company, Midland, Mich., a corporation of Delaware
No Drawing. Filed Sept. 6, 1963, Ser. No. 307,016
4 Claims. (Cl. 260—874)

The present invention relates to water-soluble, high molecular weight, graft polymers and to a process for their preparation. More specifically, the invention concerns graft polymers of ethylenimine and polyacrylic or polymethcrylic acids.

The use of a number of mineral acid or organic acid initators to prepare polymers of ethlenimine in aqueous solution is known. In the prior art processes, however, water-solubility of the polymer product is generally attained only by sacrificing molecular weight, i.e., the molecular weights of the polymer must be limited to relatively low values in order to prepare water-soluble products.

It has now been discovered that water-soluble high molecular weight polymers can be prepared by employing polyacrylic acid, hereafter PAA, polymethacrylic acid, hereafter PMA, or mixtures thereof as initiators in the polymerization of ethylenimine.

In the general method of the present invention, water-soluble PAA, PMA, or mixtures thereof, are employed as initiators for the polymerization of ethylenimine. These initiators are prepared by polymerization of the corresponding monomers, i.e., acrylic acid or methacrylic acid, to yield an aqueous polymeric solution preferably having a viscosity (when measured, as an aqueous solution containing one weight percent polymer, in a modified Ostwald viscometer at 100° F.) of from about 0.5 to 9.0 centistokes (hereafter cs.). A ratio of polymeric initiator: ethlenimine in the range of about 1:99 to 30:70, parts by weight, is employed to prepare the water-soluble graft polymers of the present invention. For example, a graft polymer containing 1 weight percent PAA is prepared by adding 99 grams of ethylenimine to an aqueous solution of PAA containing 1 gram of PAA. The reaction product of the mixture of ethylenimine and PAA, PMA, or mixtures of PAA and PMA, is a graft-polymer characterized by recurring units which may be represented structurally as:

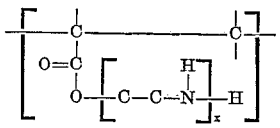

wherein the value of $x$ is dependent upon the relative amounts of ethylenimine and polymeric initiator employed. The maximum molecular weight of each polyethlenimine branch appended to the polymeric initiator "backbone" is approximately equal to that obtainable by the well-known HCl catalyzed polymerization of ethylenimine. For this reason the molecular weight of the water-soluble graft polymers of the present invention is directly dependent on the molecular weight of the polymeric initiator.

The graft polymers of the present invention are prepared by reacting ethylenimine and the polymeric initator in an aqueous solution which is heated and stirred. This aqueous solution contains from about 50 to 75 weight percent water and is maintained at a temperature within the range of about 70° to 100° C. for a period of time sufficient to yield a water-soluble graft polymer of the desired molecular weight as determined by viscosity measurements. The reaction solution is preferably maintained at a temperature of about 80 to 85° C. for a minimum time of approximately four hours and a maximum time determined by the attainment of a constant viscosity value for a water-soluble product as indicated by sampling of the reaction contents.

In the following examples and claims, the viscosities referred to, unless otherwise explained, are values in centistokes (cs.) obtained by employing a modified Ostwald viscometer to measure, at 100° F., the viscosity of an aqueous solution containing one weight percent of polymeric material. These viscosities are employed as a convenient and accurate reflection of comparative molecular weights of the polymeric material. The molecular weights of the graft polymer will be influenced by the molecular weight of the initiator, the concentration of the initiator in relationship to the concentration of the ethylenimine and the type of initiator, i.e. PAA or PMA or mixtures thereof.

The following examples described completely representative specific embodiments of the present invention. These examples, however, are not to be interpreted as limiting the invention other than as defined in the claims.

All parts expressed in the examples are parts by weight unless otherwise stated.

*Example 1*

The polyacrylic acid employed as an initiator in the later following examples was prepared according to the following procedure. A quantity of 150 milliliters of acrylic acid 830 milliliters of water, and 20 milliliters of a 35 weight percent hydrogen peroxide aqueous solution were introduced into a reaction vessel equipped with means for stirring and temperature control. The mixture was stirred and maintained at a temperature within the range of 55° to 60° C. for 20 hours during which time the acrylic acid polymerized to form a final polymer product having a 1% viscosity of 3.07 cs.

Polymethacrylic acid was prepared in a similar manner and was employed in the form of an aqueous solution of polymer having a 1% viscosity of 1.40 cs.

*Example 2*

Ethylenimine was polymerized by employing polyacrylic acid as an initiator in the following manner. A quantity of 198 grams of ethylenimine was introduced into a reaction vessel, equipped with means for stirring and temperature control, which contained 202 grams of a one weight percent solution of polyacrylic acid prepared as in Example 1. The contents of this flask was heated to 80° C. and maintained at that temperature for 12 hours with continuous stirring. At the end of this 12 hour period a polymeric product resulted having a one percent viscosity of 1.39 cs. The following tables show the results of polymerization of ethylenimine (hereafter EI) in accordance with the procedure of Example 2 wherein the initiator was prepared in accordance with the procedure of Example 1. In each case, the concentrations employed were varied as indicated in the tables. The viscosity of the graft polymer product is reported both in terms of centipoises (cps.) of a 25 weight percent polymer solution at 25° C. and of centistokes (cs.) of a one weight percent polymer solution at 100° F.

TABLE I.—EFFECT OF MOL. WT. OF PAA ON FINAL GRAFT POLYMER VISCOSITY

| 1% Viscosity PAA, 100° F. | PAA conc., wt. percent | EI conc., wt. percent | Total polymer product conc., wt. percent | Viscosity of 25% graft polymer sol'n at 25° C. | 1% viscosity of polymer at 100° F. |
|---|---|---|---|---|---|
| .866 cs | 3 | 97 | 25 | 75 cps | .850 cs. |
| 3.07 cs | 3 | 97 | 25 | 375 cps | 1.24 cs. |
| 7.15 cs | 3 | 97 | 25 | 2,175 cps | 1.89 cs. |

As seen in Table I, above, the employment of higher molecular weights of PAA, i.e. higher viscosity of PAA, under otherwise standard conditions results in a more viscous graft polymer. The graft polymer product, equal to 25 wt. percent based on the total polymer-water system, was water-soluble in each case.

TABLE II.—COMPARISON OF INITIATORS

| 1% viscosity of initiator at 100° F. | Conc. of initiator, wt. percent | Conc. of EI, wt. percent | Total polymer product conc., wt. percent | 1% viscosity of polymer at 100° F. |
|---|---|---|---|---|
| PMA—1.40 cs | 3 | 97 | 25 | 1.73 cs. |
| 1 part PMA–1.47 cs<br>1 part PAA | 3 | 97 | 25 | 1.27 cs. |

In Table II, above, the comparative effect of employing PMA and a 50:50 mixture of PMA and PAA is shown. The graft polymer product was water-soluble in both cases and equaled 25 weight percent of the aqueous-polymer solution.

TABLE III.—EFFECT OF TOTAL POLYMER CONCENTRATION

| 1% viscosity of PAA | Conc. of PAA, wt. percent | Conc. of EI, wt. percent | Total poly-product conc. wt. percent | 1% polymer viscosity at 100° F. |
|---|---|---|---|---|
| 3.07 cs | 2 | 98 | 50 | 1.39 cs. |
| 3.07 cs | 3 | 97 | 25 | 1.24 cs. |

The polymer product viscosity increases appreciably, as expected, when less water is employed. The above examples resulted in water-soluble graft polymer products.

TABLE IV.—EFFECT OF CHANGE IN PAA:EI CONCENTRATION

| 1% PAA viscosity, 100° F. | PAA conc., wt. percent | EI conc., wt. percent | Total polymer product conc., wt. percent | 1% polymer product viscosity at 100° F. |
|---|---|---|---|---|
| .866 cs | 63 | 37 | ¹ 25 | |
| .866 cs | 20 | 80 | ¹ 25 | .893 cs. |
| .866 cs | 3 | 97 | ¹ 25 | .850 cs. |

¹ Solid gel formed.

The polymer product becomes water-insoluble when the ratio of PAA:EI is increased to 63:37. At lower ratios, a higher polymer product viscosity is observed as the amount of initiator is increased.

The graft polymers of the present invention have valuable utility as additives for improving the wet strength of paper. The wet strength improvement resulting from use of the graft polymers of the present invention is much greater than that resulting from the use of either polyacrylic acid, polymethacrylic acid or polyalkylenimine alone. The degree of wet strength improvement resulting from the use of the graft polymers of this invention is effected by: (1) the molecular weight of the polymeric initiator and (2) the concentration of polymeric initiator in the polymer.

The wet strength increases with the molecular weight (as represented by the 1% viscosity values in the later-following examples) of the PAA or PMA initiator with a maximum wet strength value reached when the 1% viscosity of the initiator increases to 4.45 cs. At viscosities greater than 4.45 cs. the wet strength value decreases.

The wet strength improvement also increases with increasing graft polymer product viscosity. This viscosity, in turn, increases with increasing concentration of polymeric initiator employed. The upper limit here is dictated by the necessity of retaining water-solubility in the polymer product and the maximum amount of polymeric initiator which can be employed is less than about 30 weight percent based upon the combined amount of initiator and EI employed. Similarly, the total concentration of initiator and EI is in turn limited to about 50 weight percent based on total weight of the aqueous initiator-EI system employed.

*Example 3*

A series of graft polymers were prepared from PAA and EI by the procedures of Examples 1 and 2 and the utility of these materials in improving strength characteristics of paper were tested. The procedure for preparing hand sheets of paper treated with the graft polymers followed that outlined by the Technical Association of the Pulp and Paper Industry (TAPPI) Standard T205 m–53. Wet and dry burst strengths were determined in accordance with the procedures outlined in TAPPI Standard T403 m–53. Table V, below, is a compilation of the data obtained from these tests with the burst strengths reported in terms of pounds per square inch (p.s.i.).

TABLE V

| 1% viscosity of PAA at 100° F. | Percent PAA in polymer | Percent polymer in concentrate | 1% viscosity of of polymer product at 100° F. | Wet burst, p.s.i. | Dry burst, (pulp), p.s.i. | Percent wet burst/dry burst |
|---|---|---|---|---|---|---|
| 2.20 cs | 0.1 | 50.0 | (¹) | (¹) | (¹) | |
| 2.20 cs | 0.3 | 50.0 | .90 cs | 6.10 | 21.5 | 27.9 |
| 2.20 cs | 3.0 | 50.0 | 1.07 cs | 7.15 | 21.5 | 33.1 |
| 2.20 cs | 10.0 | 25.0 | 1.58 cs | 8.20 | 21.5 | 38.1 |
| 2.20 cs | 15.0 | 25.0 | 1.70 cs | 8.90 | 21.5 | 41.4 |
| 2.20 cs | 20.0 | 25.0 | 2.40 cs | 12.20 | 21.5 | 56.8 |
| 2.20 cs | 30.0 | 25 | Insoluble | | | |
| 3.57 cs | 3.0 | 50.0 | 1.08 cs | 8.24 | 21.5 | 38.2 |
| 3.57 cs | 6.0 | 50.0 | 1.33 cs | 8.18 | 21.5 | 38.0 |
| 3.57 cs | 10.0 | 33.0 | 3.48 cs | 11.73 | 21.5 | 54.4 |
| 3.82 cs | 3.0 | 50.0 | 1.19 cs | 9.32 | 21.5 | 43.3 |
| 3.82 cs | 6.0 | 33.0 | 1.51 cs | 9.52 | 21.5 | 43.0 |
| 4.45 cs | 3.0 | 50.0 | 1.08 cs | 9.65 | 21.5 | 44.8 |
| 4.45 cs | 6.0 | 33.0 | 1.45 cs | 10.03 | 21.5 | 46.5 |
| 6.50 cs | 3.0 | 50.0 | | 8.98 | 21.5 | 42.7 |

¹ Insufficient PAA to imitate polymerization.

In Table VI, below, data are reported on samples of PAA alone and PEI alone (the latter prepared by HCl initiated polymerization of ethylenimine), which were similarly tested for utility as wet strength improvers. The results, when compared with those in Table V, above, demonstrate the market improvement of wet strength when the graft polymers of the present invention are employed.

TABLE VI

| Sample | 1% viscosity of polymer at 100° F. | Wet burst strength, p.s.i. | Dry burst, p.s.i. | Percent wet burst/dry burst |
|---|---|---|---|---|
| PEI | .86 cs | .42 | 21.5 | 1.9 |
| PAA | 2.76 cs | .42 | 21.5 | 1.9 |

We claim:
1. A method for preparing water-soluble graft polymers of ethylenimine and a polymeric initiator selected from the group consisting of polyacrylic acid, polymethacrylic acid and mixtures thereof, said polymeric initiator having a 1 percent solution viscosity at 100° F. of from about 0.8 centistoke to about 8.0 centistokes, which comprises heating together at a temperature of from about 70° to 100° C.;
   (A) From about 99 to 70 parts by weight of ethylenimine, and
   (B) From about 1 to 30 parts by weight of said polymeric initiator,
in aqueous solution, said solution containing from about 25 to 50 weight percent water, for a period of time sufficient to yield a water-soluble graft polymer, said water soluble graft polymers having a one percent solution viscosity at 100° F. of from about 0.8 centistoke to about 4.0 centistokes.

2. The product prepared by the process of claim 1.

3. A method for improving the wet strength of paper which comprises incorporating into said paper from about 0.1 to 5 weight percent, based on the weight of the dry paper pulp employed, of the graft polymer product of claim 2.

4. The method of claim 1 wherein said ethylenimine and said polymeric initiator are heated together for at least four hours at a temperature of about 80° to 85° C.

References Cited by the Examiner

UNITED STATES PATENTS

| | | | |
|---|---|---|---|
| 2,698,793 | 1/1955 | Landes et al. | 260—2 |
| 3,113,038 | 12/1963 | Lattarulo et al. | 117—140 |
| 3,119,731 | 1/1964 | Strole et al. | 162—164 |
| 3,122,447 | 2/1964 | Sefsmith | 117—140 |

MURRAY TILLMAN, *Primary Examiner.*

J. T. GOOLKASIAN, *Assistant Examiner.*